(12) United States Patent
Renaud et al.

(10) Patent No.: US 12,351,500 B2
(45) Date of Patent: Jul. 8, 2025

(54) TOOL FOR LOCALLY COOLING A GLASS SHEET

(71) Applicant: SAINT-GOBAIN GLASS FRANCE, Courbevoie (FR)

(72) Inventors: Romain Renaud, Paris (FR); Jérôme Gobin, Saint Leger aux Bois (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 375 days.

(21) Appl. No.: 17/782,365

(22) PCT Filed: Dec. 3, 2020

(86) PCT No.: PCT/FR2020/052272
§ 371 (c)(1),
(2) Date: Jun. 3, 2022

(87) PCT Pub. No.: WO2021/111084
PCT Pub. Date: Jun. 10, 2021

(65) Prior Publication Data
US 2023/0002267 A1 Jan. 5, 2023

(30) Foreign Application Priority Data

Dec. 3, 2019 (FR) ...................................... 1913652

(51) Int. Cl.
*C03B 27/044* (2006.01)
*B28D 1/14* (2006.01)
(Continued)

(52) U.S. Cl.
CPC ............ *C03B 27/0442* (2013.01); *B28D 1/14* (2013.01); *B28D 7/02* (2013.01); *C03B 21/02* (2013.01);
(Continued)

(58) Field of Classification Search
CPC ....... C03B 35/207; C03B 27/00; C03B 23/02; C03B 23/03; C03B 27/04; C03B 23/0235;
(Continued)

(56) References Cited

U.S. PATENT DOCUMENTS 3,799,752 A * 3/1974 Cheron ............... C03B 27/0447
65/351
5,393,316 A * 2/1995 Sugiyama ........... C03B 23/0302
65/273
(Continued)

FOREIGN PATENT DOCUMENTS

EP   EP 2 918 556 A1   9/2015
WO   WO 99/15469 A1   4/1999
(Continued)

OTHER PUBLICATIONS

International Search Report as issued in International Patent Application No. PCT/FR2020/052272, dated Feb. 23, 2021.

*Primary Examiner* — Erin Snelting
*Assistant Examiner* — Steven S Lee
(74) *Attorney, Agent, or Firm* — Pillsbury Winthrop Shaw Pittman LLP

(57) ABSTRACT

A tool for local cooling by contact of a glass sheet at a temperature higher than 450° C., known as a contact tool, includes a contact face suitable for coming into contact with the glass sheet, the tool including an internal pipe for the circulation of a coolant, in particular air. The tool is used in a device for bending and/or cooling a glass sheet, in particular individual, the tool coming into contact with the glass sheet while it is held by a bending tool or by a cooling frame after bending. A compression zone is created that is capable of being drilled to form an edge having compressive stresses.

20 Claims, 5 Drawing Sheets

(51) Int. Cl.
  *B28D 7/02* (2006.01)
  *C03B 21/02* (2006.01)
  *C03B 23/03* (2006.01)
  *C03B 27/004* (2006.01)
  *C03B 27/04* (2006.01)

(52) U.S. Cl.
  CPC ...... *C03B 23/0305* (2013.01); *C03B 23/0307* (2013.01); *C03B 27/004* (2013.01); *C03B 27/0404* (2013.01)

(58) Field of Classification Search
  CPC .... C03B 27/004; B25J 19/0054; B65G 49/06; B65G 49/07
  See application file for complete search history.

(56) References Cited

U.S. PATENT DOCUMENTS

| | | | | |
|---|---|---|---|---|
| 5,779,755 | A | * | 7/1998 | Kuster .................. C03B 27/004 65/351 |
| 6,574,992 | B1 | * | 6/2003 | Kuster ................ C03B 27/0404 65/374.13 |
| 2004/0094979 | A1 | * | 5/2004 | Damhuis ............. B25J 15/0616 294/65 |
| 2006/0043747 | A1 | * | 3/2006 | Kniss ..................... B25J 13/086 294/65 |
| 2007/0157671 | A1 | * | 7/2007 | Thellier ............. C03B 23/0357 65/106 |
| 2014/0234576 | A1 | * | 8/2014 | Berard ..................... B60J 1/001 296/216.01 |
| 2014/0305248 | A1 | * | 10/2014 | Yazawa ................. B25J 9/0012 901/27 |
| 2018/0319144 | A1 | * | 11/2018 | Faik ..................... B65G 49/061 |

FOREIGN PATENT DOCUMENTS

| WO | WO 2013/054059 A1 | 4/2013 | |
|---|---|---|---|
| WO | WO 2014/057200 A1 | 4/2014 | |
| WO | WO 2014/057224 A1 | 4/2014 | |
| WO | WO 2014/131972 A1 | 9/2014 | |
| WO | WO-2018020087 A1 * | 2/2018 | ........... C03B 23/023 |
| WO | WO-2018154247 A1 * | 8/2018 | ......... C03B 23/0252 |
| WO | WO-2018154248 A1 * | 8/2018 | .......... B65G 49/061 |
| WO | WO 2019/002751 A1 | 1/2019 | |

* cited by examiner

[Fig. 1]
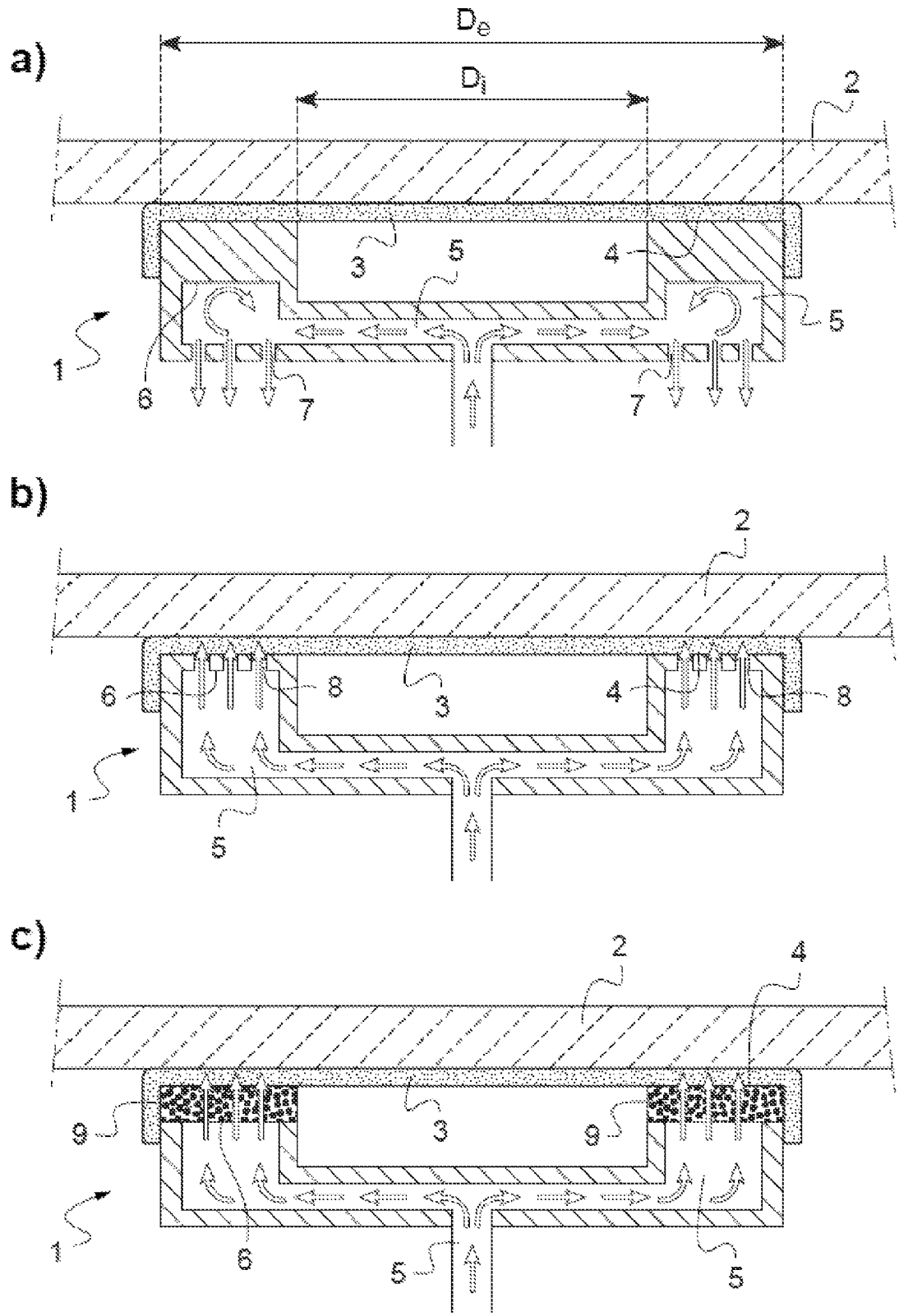

[Fig. 2]
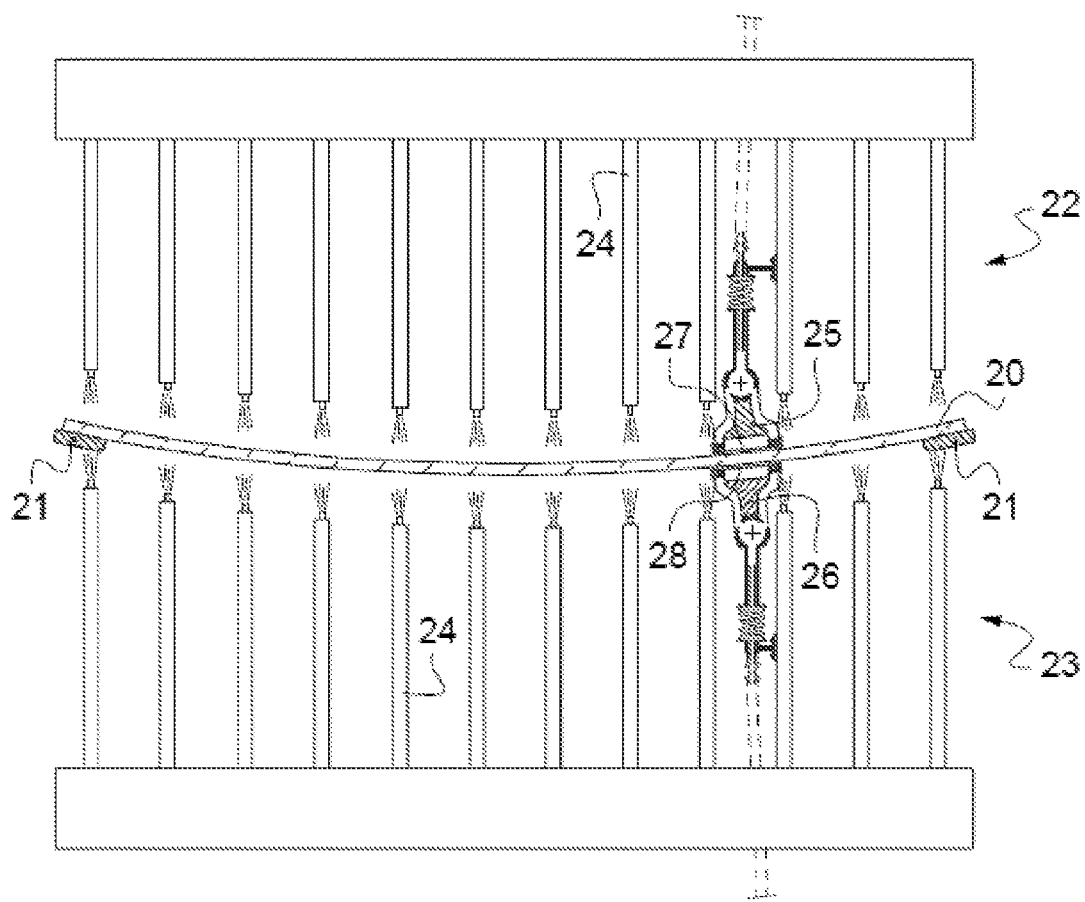

[Fig. 3]
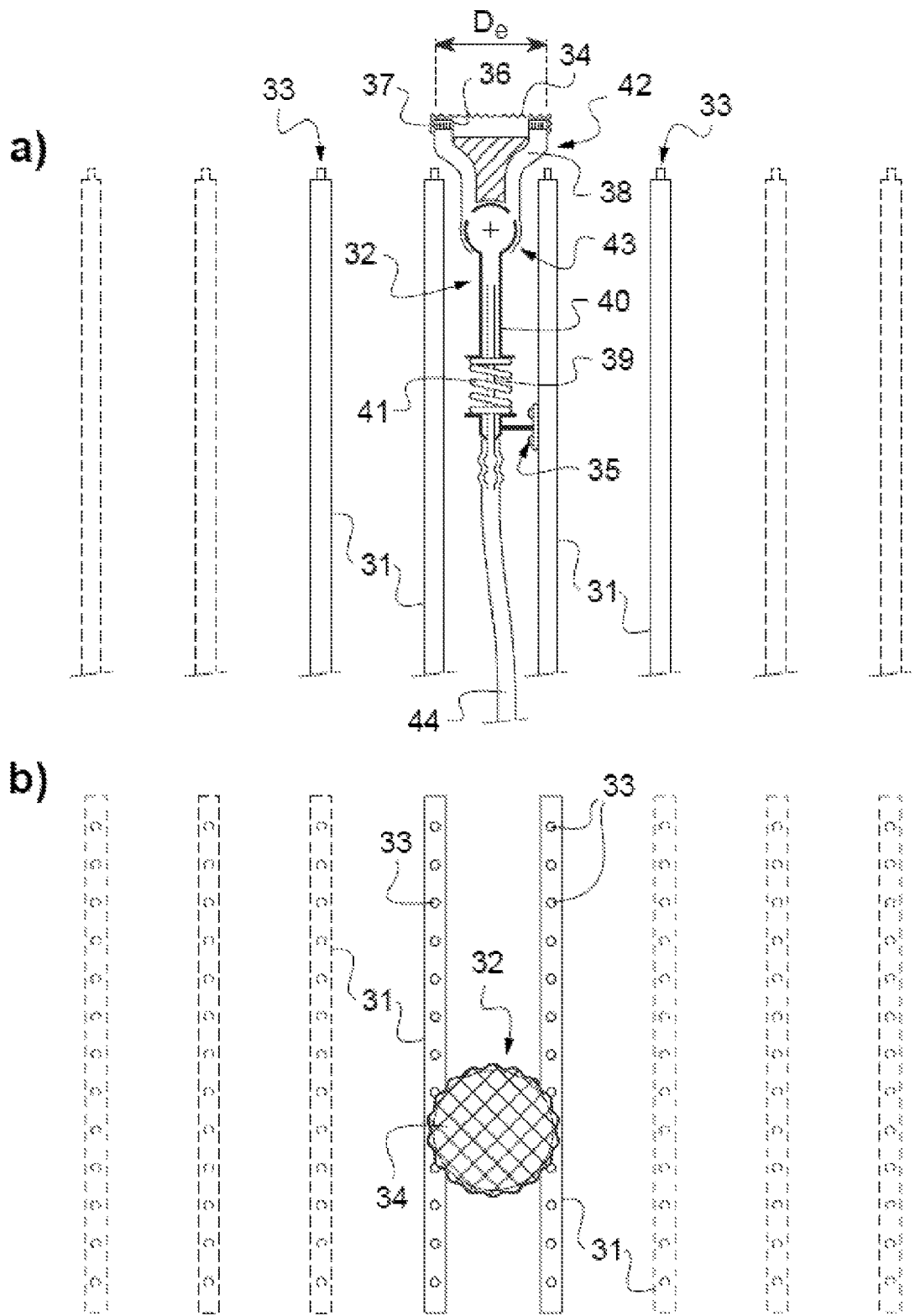

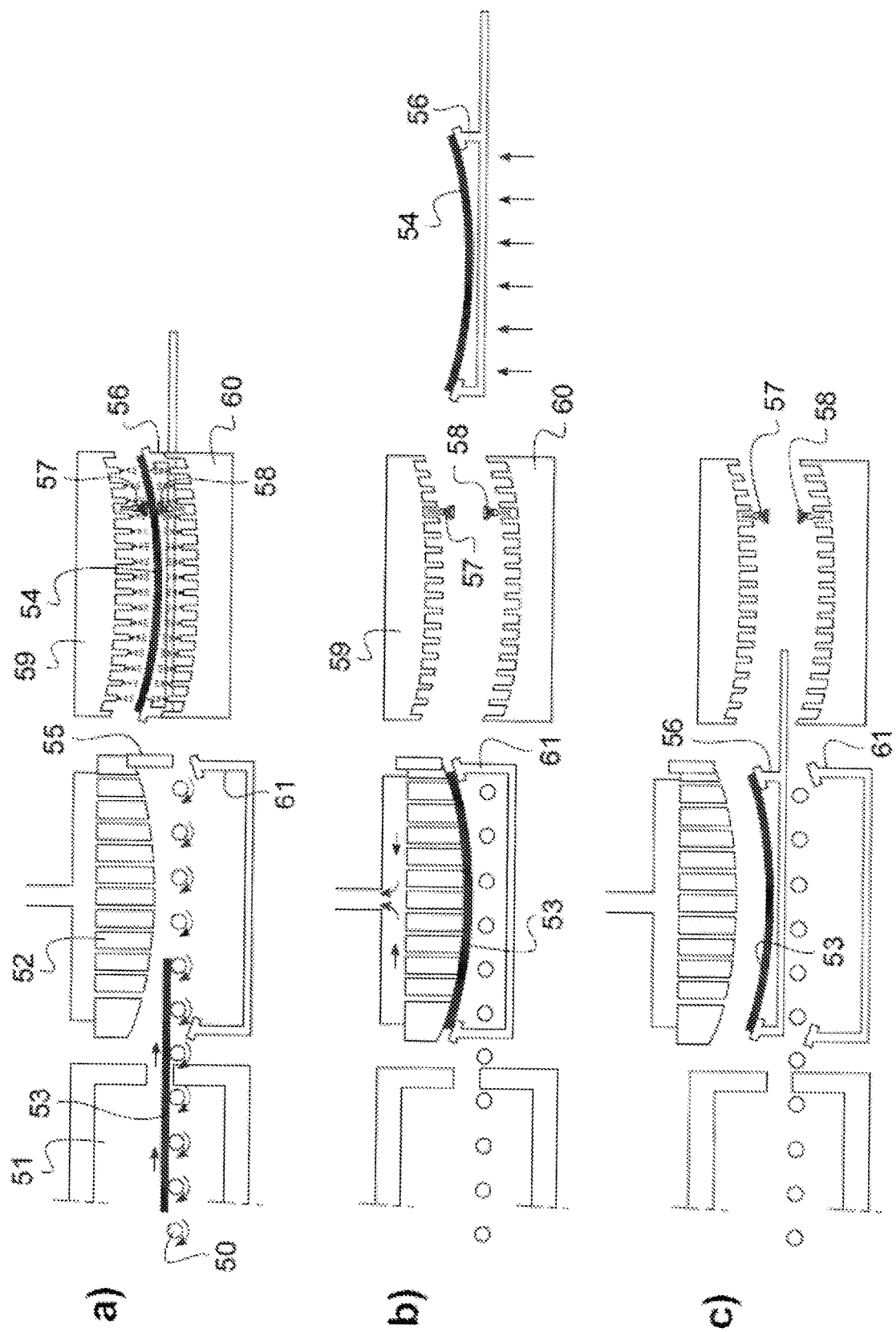

[Fig. 5]
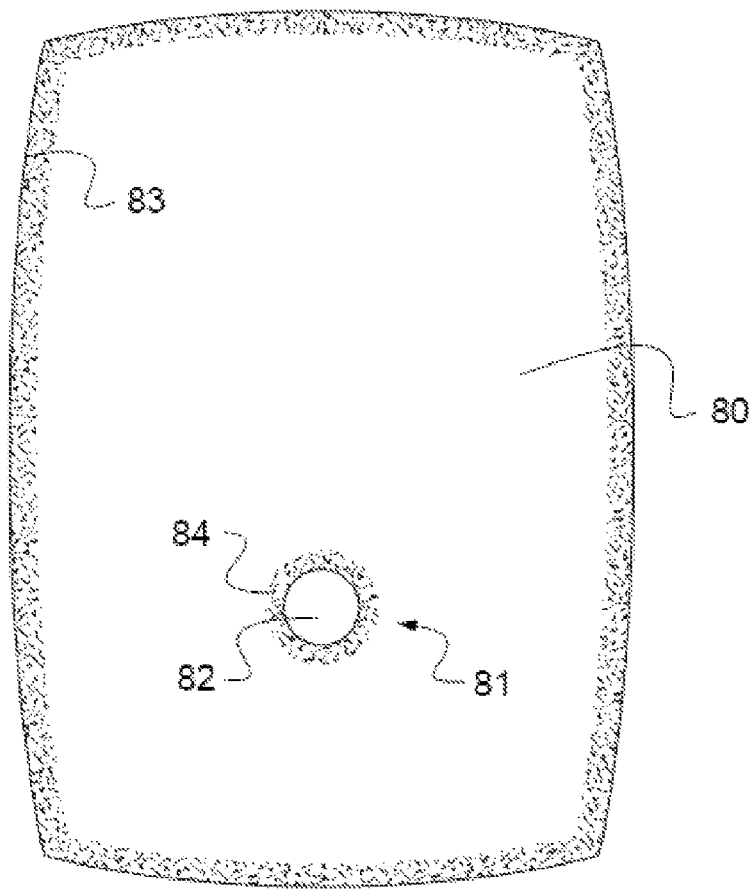

TOOL FOR LOCALLY COOLING A GLASS SHEET

CROSS-REFERENCE TO RELATED APPLICATIONS

This application is the U.S. National Stage of PCT/FR2020/052272, filed Dec. 3, 2020, which in turn claims priority to French patent application number 1913652 filed Dec. 3, 2019. The content of these applications are incorporated herein by reference in their entireties.

The invention relates to the field of monolithic glass panels (comprising a single glass sheet) or laminated glass panels, comprising at least one orifice with a reinforced edge.

Most motor vehicle glass panels having orifices for various functions (passing through cables from an antenna fastened to a sunroof, passing through the back windscreen wiper rod for a laminated back window, potentially passing through roof bar fastening rods in a glass roof, and more generally for incorporating electronic or mechanical elements, etc.) are produced having been drilled on the flat glass before bending. This technique has the following drawbacks:

Misalignment of the hole between the two glass sheets: when the glass sheets are drilled prior to the forming process, they have completely identical dimensions. Once formed, the sheets can therefore be superposed perfectly. However, during the assembly operation, the stacking of the two glass sheets is never perfect and the edges of the hole in each glass sheet are slightly misaligned with each other; the usual assembly tolerances are generally between 0.5 and 1 mm; the misalignment between the sheets can have different origins, such as 1) incorrect positioning during the manufacturing of the glass/PVB/glass sandwich (before de-airing and autoclaving) or 2) due to creep and movement of one glass sheet relative to the other during autoclaving. Such an imperfection in the alignment of the holes of each individual sheet can have different unfortunate consequences: a) aesthetically, when the edge of the hole is visible, b) difficulty of incorporating a mechanical part the fit tolerances of which are smaller than the misalignment between the two glass sheets, c) greater stress and therefore increased risk of breakage on contact between a mechanical part passing through the hole and the edge thereof.

Poor reflective optics quality and "volcano effect": during the forming operation by pressing and during the time spent on a cooling frame, the edge of the hole tends to counter-bend, that is, protrude from the bent surface on the side of the convex face of the glass panel; seen from the outside of the vehicle, the edge of the hole is therefore slightly volcano-shaped; this movement of the order of a few tenths of a millimeter is very visible in reflection.

Management of the hole during the laminated glass panel assembly operation (known as lamination): it is more complicated to manage a product with a hole; details of three major difficulties are given below:

1) the two glass sheets must be centered more meticulously, in order to minimize any misalignment between the glass sheets;

2) the handling of the polymeric interlayer sheets (generally PVB) is complex in the following three cases:

2a) either the interlayer sheet is cut before entering the autoclave once the glass/interlayer/glass sandwich has been made; an additional step must then be performed by inserting a knife into the hole in the glass sheets in order to remove the PVB film lodged between them; this cut must be performed with care so that no excess PVB is left and also poses the risk of damaging and weakening the edge of the hole if the knife was to come into contact with it;

2b) or the interlayer sheet is cut prior to the glass/interlayer/glass sandwich being made; such an operation is simpler to perform than in situation 2a) but leads to additional complexity when the sandwich itself is made as any misalignment between the three components (the two glass sheets and the interlayer sheet) must be minimized; if during the assembly operation these three components are not perfectly aligned, the upper glass sheet must be removed so that the PVB sheet can be recentered relative to the lower glass, and then replaced, which requires patience and concentration and leads to significant losses of production speed;

2c) or the interlayer sheet blocking the hole present in each glass sheet is left as it is; however, such a solution is unsatisfactory as left as it is, the interlayer tends to creep during the autoclaving operation and this leads to even more painstaking finishing operations on the final inspection line;

3) it is difficult to obtain satisfactory degassing of the glass/interlayer/glass sandwich in the presence of a hole in the glass sheets, as a hole in the sandwich represents an additional possible entrance for air. This hole must be plugged momentarily, for example by bonding an adhesive aluminum sheet in order to avoid any ingress of air through the edge of the hole during degassing; this therefore adds two operations: a) applying the adhesive then b) removing this adhesive after calendering, creating a vacuum using a peripheral seal or a vacuum bag, then heating (between 80 and 120° C.) or after the autoclaving operation.

Additional drilling operations: drilling the individual glass sheets before assembly means one drilling operation per glass sheet, with all of the operations to check the satisfactory positioning on each one, while a single drilling operation on a previously assembled laminated glass panel saves a drilling step.

In the case of a single drilling operation on previously assembled laminated glass panel, if no local compressive stress has previously been applied in the location of the orifice, drilling can be performed without breakage, but the mechanical strength of the glass is very low. This is explained by the presence of extension stresses in the mid-plane of each glass sheet originating from the cooling of the glass from the two surfaces of each sheet. If a hole is made, these extension stresses are modified and reduced but residual extension (of a value half that of the extension before drilling) persists at the edge of the hole and then becomes a point of extreme fragility for the glass.

The generation of compressive stresses in the location of an orifice to be drilled after lamination of a glass panel, said lamination having been performed after sag bending of the glass sheets in pairs (the two sheets are superposed during bending) is proposed in WO2013054059. However, for short production runs, it is advantageous to use a method for bending individual sheets (not superposed during bending) known as "sheet-by-sheet" because a) the product development time is reduced (due to faster and simpler process set-up), b) the tool costs are very significantly lower, and c) the production start-up time is also greatly reduced. It is therefore useful to develop solutions so that laminated glass panels with orifices can be produced, the glass sheets having been bent "sheet-by-sheet".

WO2014131972 discloses the use of a mechanical reinforcement in the location of a hole in a glass panel using a bonded additional part. This makes it possible to mechanically reinforce the zone of the hole as it offers a support for a lighting system inside the passenger compartment.

WO2014057224 describes a laminated glass panel a single glass sheet of which is drilled, comprising an electrical conductor inserted into the PVB sheet in order to make it invisible from the outside or the inside of the vehicle. WO2014057200 describes a method for manufacturing this type of product.

WO2019/002751 discloses the sheet-by-sheet manufacturing of glass panels comprising a compression zone obtained by air blowing.

The invention relates to a tool for local cooling by contact with a glass sheet at a temperature higher than 450° C., in particular higher than the strain point temperature of the glass, known as a contact tool, comprising a contact face suitable for coming into contact with the glass sheet, said tool comprising an internal pipe for the circulation of a coolant, in particular air. The circulation of the coolant is suitable for cooling the contact face of the tool and therefore also cooling the local zone of the sheet in contact with said contact face.

The invention relates more particularly to a tool for local cooling by contact of a glass sheet at a temperature higher than 450° C., known as a contact tool, comprising an internal pipe for the circulation of a coolant, in particular air, and a contact face suitable for coming into contact with the glass sheet comprising a peripheral compression belt, said tool being configured to create, by means of said contact face, a local compression zone that, situated at least partially inside the peripheral compression belt of the sheet, has an area of less than 10%, and even less than 5%, or even 2%, of the area of the glass sheet.

The invention also relates to a device for bending and/or cooling a glass sheet, in particular individual (that is, not superposed with another glass sheet) comprising at least one contact tool according to the invention for coming into contact with the glass sheet while it is held by a bending tool or by a cooling frame after bending. Generally, the cooling is forced cooling by air blowing. The contact tool can be applied during the bending phase, and/or after bending while the glass is held by a cooling frame and is arriving between cooling units.

The strain point is determined by the method of measuring the viscous elongation rate of a glass fiber, by extrapolation from the annealing point, and in accordance with ASTM C336-71 (reapproved in 2005). The expression "strain point" is well known to a person skilled in the art. Reference is therefore made to strain point temperature, or more simply to strain point. Below this temperature, the permanent stresses in the glass can practically no longer change, apart from in several hours and at a temperature close to strain point. According to the invention, by contact above the strain point of the glass, the aim is that the contact tool comes into contact with the glass while its internal stresses are not frozen. Given the strain point temperatures of glass, contact with the glass is made while it is at a temperature higher than 450° C. and even higher than 500° C. Generally, the contact tool comes into contact with the glass while it is at a temperature higher than 510° C. and generally higher than 520° C. and more generally higher than 530° C. The local contact creates a temperature difference between the contact zone and the glass surrounding this zone, the contact zone being made colder than the glass surrounding it. In order to create the local compression zone, it is necessary that a temperature difference be maintained between the contact zone and the zone surrounding the contact zone, until the temperature of the sheet reaches, during the cooling thereof, the strain point temperature. In order to ensure that such a difference is kept, the contact between the contact tool and the glass can be maintained until the temperature of the contact zone falls to the strain point, but this is not strictly necessary. The contact tool can also remain in contact with the glass below the strain point of the glass, but this is not strictly useful. Generally, the contact tool comes into contact with the glass when it is at a temperature less than 700° C.

If the tool is applied during bending (embodiment A), a contact tool can be mounted on a pressing frame, said tool pressing on the lower face of the glass at the moment when it is pressed under the upper bending form. The contact time between the contact tool and the glass can be the same as the pressing time. After pressing, the glass continues its cycle in the standard way.

If the contact tool is applied after bending (embodiment B), the tool is applied while the glass is held by a cooling frame and is arriving between blowing units. Two contact tools are fastened to the upper and lower blowing units. They are adjusted coaxially, that is, they are facing each other so that they come into contact with the same zone of the glass, but each on a different main face of the glass. At the moment when the glass, supported on its periphery by the cooling frame, stops in the units, the movement together of the units can be used to place the contact tools in contact with the glass, on either side of the glass sheet. Cooling therefore takes place on both faces of the glass, symmetrically, ensuring symmetrical distribution of the cooling and therefore of the stresses in the thickness of the glass. After a contact time generally within the range of one to ten seconds, the opening of the units allows the cooling frame supporting the frozen glass to extract it from between the units and embark it on the continuation of the process, including secondary cooling. The longer the contact time, the more detrimental the impact on the manufacturing time, but the greater the intensity of the stresses generated.

Each of the embodiments has specific advantages:

Advantages of embodiment A: the local cooling by contact with the contact tool is more intense as the glass is at a higher temperature. The stresses generated at the edge of the hole can be very significant as a result.

Advantages of embodiment B: two contact tools act simultaneously on either side of the same zone of the sheet so that the cooling propagates symmetrically to the core of the sheet, and the surface of the edge of the hole cut is then fully in compression, which results in excellent mechanical robustness.

According to the invention, local compressive stresses are created in each individual sheet, then different sheets are assembled into a laminated glass panel, the local compression zones of all of the sheets to be assembled being superposed (that is, facing each other), then the assembled laminated glass panel is drilled in or on the border of the local compression zones so as to create an orifice in the laminated glass panel, said orifice having edge compressive stresses capable of giving it satisfactory mechanical strength. The advantages of this method are as follows:

no misalignment of the edges of the holes in the glass sheets;

the sheet of interlayer material comes right up to the edge of the hole without any missing material (which can occur when a pre-drilled sheet of interlayer material is used) or excess material on the border of the hole (which can occur when the interlayer material present in the hole is removed after drilled glass sheets have been assembled, before forming, with a non-drilled sheet of interlayer material);

perfect reflective optics at the edge of the hole (no volcano effect);

no cutting to be managed in the sheet of interlayer material; the assembly/degassing operations take place as for a non-drilled product.

It must be noted that a laminated glass panel according to the invention can be drilled very successfully, and much better than a laminated glass panel devoid of local compressive stresses. The robustness of this drilling operation is attributed to the fact that drilling is carried out in a compression zone, which prevents the propagation of cracks during this operation.

Advantageously, the contact face of the contact tool is made from an air-permeable material comprising refractory fibers, known as fibrous material. This fibrous material can be one of those commonly used by a person skilled in the art to cover tools intended to come into contact with hot glass, at a temperature at which contact with a metal tool can mark the glass. This fibrous material is flexible and can be a woven fabric or a knitted fabric or a nonwoven fabric such as a mat or felt. This fibrous material generally has a thickness in the range of 0.3 to 3 mm and preferably of 0.5 to 2 mm.

The tool comprises a pipe through which a coolant, generally air, travels. This pipe passes sufficiently near the contact face of the contact tool in order to cool this face effectively. This pipe is inside the contact tool and can simply allow the circulation of this coolant without it being able to leave it near the glass. The coolant is then conveyed out of the tool by an outlet pipe. An opening in the pipe can however make it possible to discharge the coolant after it has passed near the contact face. This opening can in particular be directed so that the jet of coolant travels in the opposite direction to the glass.

Provision can also be made for the contact tool to comprise a contact surface made from the air-permeable fibrous material mentioned above, which covers a metal surface. The fibrous material is generally flexible and the metal surface that it covers is rigid. This metal surface can be capable of letting the coolant through from the pipe to the fibrous material. In this case, the coolant can leave the pipe and pass through the metal surface and then circulate in the fibrous material and even come into contact with the glass. According to this variant, there is a combination of cooling by contact and by convection. The metal surface can comprise orifices allowing the coolant to leave the pipe and circulate through the fibrous material. The metal surface can be the surface of an open-pored material, in particular made from sintered metal particles, known as porous material, allowing the coolant to leave the pipe and circulate through the fibrous material.

When it is intended to drill an orifice in the zone to be cooled, the local cooling is advantageously applied by the contact tool on the glass along an outline corresponding substantially to the shape of the orifice. Generally, the local compression zone created by the contact tool according to the invention can be inscribed in a circle with a diameter less than or equal to 80 mm. As the orifice is generally circular, the tool advantageously applies local cooling in the shape of a circular ring. The contact face can thus be made from a fibrous material covering a ring-shaped rigid metal surface (by opposition to the flexible fibrous material). Generally, the outer diameter $D_e$ of the ring-shaped metal surface is in the range of 20 to 60 mm and the inner diameter Di of the ring-shaped metal surface is in the range of $D_e$–0.5 mm to $D_e$–20 mm. The future drilled orifice will be able to have an outline corresponding to the inner outline of the ring. In this way, the ring itself corresponds to the compression zone of the final cut edge. The future drilled orifice can also have an outline inside the ring (that is, between Di and De), but it is preferably closer to the inner outline than to the outer outline of the ring.

The contact tool according to the invention must come into contact with the glass without marking it. It therefore advantageously comprises a damping member, in particular a spring, damping the coming into contact of the tool with the glass sheet.

The contact face of the contact tool can have the shape locally envisaged for the glass, or it can be flat if the orifice envisaged is small enough and the curvature of the glass is not pronounced, or if it is made from a compressible material that adapts to the shape of the glass under the effect of pressure, which is the case of the air-permeable fibrous material mentioned above. In order to ensure that the contact face is satisfactorily applied to the glass, which is generally bent in this location, it can be advantageous for the contact tool to comprise an orientation member, in particular a ball joint, allowing the contact face to change its orientation under the effect of the tool coming into contact with the glass sheet.

Advantageously, the contact tool comprises both a damping member and an orientation member.

The invention also relates to a device for bending and/or cooling a glass sheet, in particular an individual glass sheet, comprising at least one contact tool of one of the preceding claims for coming into contact with the glass when the glass sheet is held by a bending tool or by a cooling frame after bending.

The invention relates more particularly to devices and methods comprising:

the heating, in a furnace, of individual flat glass sheets (that is, not stacked) traveling one after the other on a roller conveyor, then the exiting of the individual sheets from the furnace one after the other, then the bending of the individual sheets by pressing between a bending frame supporting a sheet and an upper bending form, then the general cooling of the sheets supported by a cooling frame, in particular by forced convection by air blowing, in particular tempering or semi-tempering them.

According to this embodiment, bending is not applied in a heated enclosure, but by tools located in the ambient air. Each sheet leaving the furnace at its bending temperature therefore passes between the bending tools immediately, before its temperature is too low.

If the contact tool is used during bending, the device can comprise an upper bending form, a bending frame to support the sheet and press its periphery against the upper bending form, at least one contact tool being rigidly connected to the bending frame so that the contact face comes into contact with the glass sheet when it is held by the bending frame, in particular during the pressing of the glass sheet between the bending frame and the bending form.

The general cooling can comprise forced convection by air blowing. To this end, the device can comprise a forced cooling system by blowing air onto the glass sheet supported by a cooling frame. This blowing is performed on the whole of one main face and generally on the whole of the two main faces of each glass sheet. In particular, the forced cooling system can comprise cooling units capable of blowing cooling air towards the two main faces of a glass sheet resting on the cooling frame arranged between the two cooling units, at least one contact tool being mounted on at least one cooling unit. Preferably, at least one contact tool is mounted on each cooling unit, in which case these two tools are arranged facing so that they can cool the same zone of the glass but through its two faces at the same time. A suitable cooling unit comprising suitable blowing nozzles (but without a contact tool) is in particular described in WO99/15469.

Generally, the cooling units are capable of being moved vertically relative to each other, allowing them to move together or apart, the units being capable of moving together when the cooling frame holding a glass sheet is between them so that each contact tool provided on a cooling unit comes into contact with one face of the glass sheet during or at the end of the moving together of the two units.

In addition to the local compression zone, the glass sheet also comprises an edge compression belt fully surrounding it. This belt is created naturally on its periphery without it being necessary to apply any particular treatment, simply because the periphery of the glass cools a little more quickly than the rest.

The contact tool is suitable for creating in the glass sheet, which is generally not flat, at least one local compression zone that is situated at least partially inside the peripheral compression belt of said sheet.

The contact tool including the contact face is configured to create a local compression zone having an area of less than 10%, and even less than 5%, even 2%, of the area of the glass sheet, that is, of the area of one of the faces of the glass sheet. Depending on the application, the zone cooled locally using the contact tool covers, for example, an area of between 0.5 cm$^2$ and 70 cm$^2$.

The invention also relates to a method for producing a local compression zone in a glass sheet, comprising
 heating the glass sheet to a temperature higher than its strain point temperature, then
 generally cooling the glass sheet to a temperature lower than its strain point temperature,
local cooling by local contact being applied by the contact tool according to the invention, the contact starting when the sheet is at a temperature higher than its strain point temperature.

In particular, the general cooling administered on the whole surface of the main faces of the glass sheets can bring about the tempering or semi-tempering of the glass. However, this general cooling, while giving the glass sheets a compression skin, can also be relatively slow and not bring about any particular thermal strengthening of the glass. This cooling is close to natural cooling (without forced convection) and the resulting glass can then have a surface stress of less than 15 MPa.

The thermal tempering of a glass sheet is given to confer on the glass sheet a surface stress of more than 90 MPa, generally between 90 and 200 MPa. Thermal semi-tempering—also known as heat strengthening—is given to confer on the glass sheet a surface stress in the range of 15 to 90 MPa, more generally in the range of 20 to 60 MPa. The aforementioned stress values are absolute values. Surface stress can be measured by a device operating on the principle of polariscopy, such as the Scalp-04 polariscope marketed by GlasStress Ltd. The value thereof is determined as being an arithmetic mean of five measurements on a main surface of the glass sheet, one measurement being taken in the middle of the glass sheet—which can be chosen as being its center of inertia—and four other measurements that are distributed at equal distances on a virtual line going around the main surface of the glass sheet at a distance from the peripheral edge of the glass sheet equal to ten times the thickness of the sheet.

The local contact is applied when the sheet is undergoing or at the end of bending and/or when the sheet is undergoing general cooling. As soon as the sheet leaves the bending tool and is resting on a cooling frame, the cooling thereof starts.

The invention also relates to a method for manufacturing a glass panel comprising a glass sheet comprising a compression zone according to the invention, followed by cutting a through-orifice in or on the border of the local compression zone.

After cutting in the local zone, the cut edge generally has an edge compressive stress of at least 1 MPa and preferably at least 2 MPa and preferably at least 3 MPa and preferably at least 4 MPa, and preferably at least 8 MPa. The intensity and duration of the local cooling are sufficient so that the desired value of edge compressive stresses is obtained after cutting. Generally, after cutting in the local zone, the cut edge has an edge compressive stress of less than 25 MPa. Within the scope of this application, the edge compressive stress values are determined by the method described in ASTM F218-2005-001. The edge compressive stress values are determined between 0.1 and 2 mm from an edge and preferably between 0.1 and 1 mm from an edge.

Cutting can be performed in several individual sheets, and these sheets then assembled into a laminated glass panel by arranging a polymeric interlayer sheet (such as PVB) between the glass sheets in a known manner. Different glass sheets having a compression zone can also first be assembled into a laminated glass panel, and the laminated glass panel cut afterwards. Of course, the compression zones of all of the sheets are superposed in the laminated glass panel. The glass panel can thus be a laminated glass panel each glass sheet of which is produced according to the invention with a compression zone, each glass sheet having, before cutting, a local compression zone facing local compression zones of the other glass sheets of the glass panel, cutting being performed on each glass sheet before assembly into a laminated glass panel, or cutting being performed after assembly of the laminated glass panel.

The drilling can be performed using known drilling means, in particular a robot can hold and orient the glass, and the drilling itself is performed by a rotating head.

The glass sheets are made from a mineral glass comprising at least 40% silica. It is generally a soda-lime-silica glass.

The invention relates in particular to glass sheets the thickness of which is in the range of 0.8 to 5 mm. It relates more particularly to glass sheets with a thickness of 1.6 mm or 2.1 mm or 2.6 mm.

Preferably, the glass sheet(s) suitable for comprising said at least one local compression zone created using the contact tool according to the invention has(have) a thickness greater than or equal to 1.6 mm.

The glass sheets can be covered or not with several thin layers such as one or more anti-IR layers, for example containing silver, or one or more so-called Low-E layers: these layers are not taken into account in the glass sheet thickness ranges given in the present application. The contact tool according to the invention can optionally come into contact with a face of the sheet coated with a thin layer, but as this does not change the essence of the invention, for the sake of simplicity, the contact tool will continue to be said to come into contact with the glass or the glass sheet.

A glass sheet produced according to the invention can be incorporated into a laminated glass panel in association with at least one other glass sheet also preferably produced according to the invention, the compression zones then being placed facing each other in the laminated glass panel. The different sheets of the laminated glass panel (generally two glass sheets) are separated by a polymeric interlayer sheet, generally PVB. The polymeric sheet can in particular have a thickness of between 0.3 and 0.9 mm, and in particular a thickness of 0.76 mm or 0.84 mm. The invention relates more particularly to bent laminated glass panels comprising two glass sheets with an identical thickness of 1.6 mm or 2.1 mm separated by a PVB sheet 0.84 mm thick.

Drilling can be performed in the assembled laminated glass panel in the compression zones of the glass in order to create cut edges having permanent edge compressive stresses and therefore good mechanical properties. The cutting tool passes through the entire glass panel at once.

FIG. 1 shows three embodiments of the tool 1 according to the invention in contact with a glass sheet 2 at more than 450° C. The contact between the tool and the glass is softened by means of a fibrous material 3 comprising refractory metal fibers. The tool comprises a contact face for coming into contact with the glass sheet, said contact face being made from the fibrous material, which covers a ring-shaped rigid metal surface 4. The ring has an outer diameter $D_e$ and an inner diameter $D_i$ (only shown in a), but also true for b) and c)). The tool comprises a pipe 5 supplied with air. The air circulates in the tool during use in order to cool it, in particular the inner surface 6 situated facing the ring-shaped rigid metal surface 4.

In a), the cooling air does not pass through the metal surface under the fibrous material and is discharged through orifices 7 into the ambient atmosphere after circulation relative to the inner surface 6.

In b), the cooling air passes through orifices 8 in the metal surface under the fibrous material and therefore has direct access to the fibrous material 3, inside which it can also circulate.

In c), the cooling air passes through an open-pored material 9 arranged between the fibrous material 3 and the pipe 5 and therefore has direct access to the fibrous material 3, inside which it can also circulate.

FIG. 2 shows a hot glass sheet 20 supported on a cooling frame 21. At this stage, the sheet has just been bent at a deformation temperature. The support and the sheet are arranged between two cooling units 22 and 23 comprising nozzles 24 for blowing cooling air onto the two main faces of the sheet in order to heat-strengthen it. Each unit is provided with a local contact tool 25 and 26 according to the invention. The two units have moved together through a relative vertical movement so that they are closer to the sheet, and during this moving together, the tools 25 and 26 have come into contact with the main faces of the glass sheet. These two tools are arranged facing each other on either side of the glass sheet so that they act on the same zone of the glass through each of its two faces. Each tool 25 and 26 can be one of the tools in FIG. 1. It will be noted that the contact faces 27 and 28 of the tools are inclined relative to the horizontal in order to follow the curvature of the sheet. This orientation has occurred automatically on contact with the glass by means of a ball joint inside the tool, shown in more detail in FIG. 3a).

FIG. 3 shows a cooling unit according to a side view in a) and a top view in b). The unit comprises nozzles 31 provided with orifices 33 for blowing cooling air towards a main face of a glass sheet (not shown). A tool according to the invention 32 is connected to a nozzle by a connector 35. The contact face 34 of the tool is made from a refractory material covering a ring-shaped metal surface comprising an outer diameter $D_e$. The tool comprises an internal pipe 38 for the circulation of air passing near the contact face. Here, the tool 32 is of the type in FIG. 1c), that is, comprising a porous material 37 arranged between the fibrous material and the internal pipe. The tool comprises a fixed tube 39 connected to a nozzle 31 by the connector 35. Another tube 40 is mounted sliding on the tube 39. A spring 41 is mounted between a stop rigidly connected to the tube 39 and a stop rigidly connected to the tube 40 in order to dampen the translation movement of the tube 40 relative to the tube 39. The spring 41 is a damping member damping the coming into contact of the tool with the glass. The contact face is mounted on a head 42 connected to the tube 40 by a ball joint 43. This ball joint 43 is an orientation member allowing the contact face to change its orientation under the effect of the tool coming into contact with the glass. Advantageously, a member for orienting the contact face of the tool, such as a ball joint 43, allows automatic orientation when the tool comes into contact with the glass, the tool thus adapting to the shape of the glass (the surface of which is generally not flat due to the bending), without requiring any adjustment. By means of an orientation member such as the ball joint 43, the contact tool 32 is "self-adapting" relative to the glass sheet, in particular but not exclusively from one application to another.

The tool is supplied with cooling air by a hose 44. The air passes through the tube 39, then the tube 40, then the ball joint 43 by means of orifices. The air then reaches the porous material 37, through which it passes in order to then pass through the fibrous material 34.

FIG. 4 shows a device for bending and cooling glass sheets 53 and 54 using the contact tool according to the invention.

The method is shown at different stages of the progress of the sheets: a) then b) then c). The individual sheets travel from left to right. They are first conveyed by a bed of rollers 50 into a furnace 51 that brings them to a bending temperature. They leave the furnace and arrive under an upper bending form 52, their travel being slowed as they approach a movable stop 55 that stops them when they are moving at very low speed. During the arrival of the sheet 53 under the bending form 52, the sheet 54 undergoes general cooling by air blowing on its two main faces by means of two blowing units 59 and 60 provided with blowing nozzles situated on either side of the glass sheet. The sheet 54 is held by a cooling frame 56. Each unit 59 and 60 is provided with a local contact tool 57 and 58 that comes into contact with one face of the sheet, the contact faces of these two tools facing each other, on either side of the sheet, in order to cool it more intensely locally. In a), the two units have moved together to blow closer to the sheet. In b), the two units have moved apart so that the tools 57 and 58 have lost contact with the sheet and the cooling frame 56 has moved the frozen sheet 54 away to take it to a secondary cooling zone. During this time, the sheet 53 is bent by pressing between the pressing frame 61 and the upper form 52. The bending form comprises through-orifices that make it possible to apply suction to the bent sheet 53. The suction is triggered to allow the pressing frame 61 to descend again, while the sheet remains held by the upper form. The cooling frame 56 is then placed under the sheet 53, then the suction is stopped and the sheet 53 is released onto the cooling frame 56. The cooling frame then carries the sheet 53 that it is supporting between the tempering units so that the sheet 53 can undergo the same cooling treatment as the sheet 54.

FIG. 5 shows a laminated glass panel 80 comprising an orifice 82. The laminated glass associates two bent glass sheets according to the invention, the zone 81 of the orifice having been cooled locally according to the invention (before drilling of the hole) for each of the two sheets. The orifice 82 has been made after assembly of the laminated glass in a single drilling operation. The shaded zones represent the zones comprising edge compressive stresses, but are in reality invisible to the naked eye. The periphery of the glass panel comprises a compressive stress belt 83 that has occurred naturally after bending during cooling, without it being necessary to blow on it. The border of the orifice 82 also comprises edge compressive stresses 84 that have been created by means of the local cooling according to the invention.

The invention claimed is:

1. A tool for local cooling by contact of a glass sheet at a temperature higher than 450° C., the tool comprising:
   an internal pipe for the circulation of a coolant;
   a contact face suitable for coming into contact with the glass sheet to locally cool the glass sheet, the contact face in communication with the internal pipe so that the contact face is cooled by the coolant, the glass sheet comprising a peripheral compression belt, and
   an orientation member configured to change an orientation of the internal pipe and the contact face under the effect of the tool coming into contact with the glass sheet,
   said tool being configured to create, by said contact face, a local compression zone that, situated at least partially inside the peripheral compression belt of the glass sheet, has an area of less than 10% of an area of the glass sheet.

2. The tool as claimed in claim 1, wherein the contact face is made from an air-permeable material comprising refractory fibers forming a fibrous material.

3. The tool as claimed in claim 2, wherein the fibrous material covers a ring-shaped metal surface.

4. The tool as claimed in claim 3, wherein an outer diameter $D_e$ of the ring is in the range of 20 to 60 mm and an inner diameter of the ring is in the range of $D_e$-0.5 mm to $D_e$-20 mm.

5. The tool as claimed in claim 2, wherein the fibrous material covers a metal surface capable of letting the coolant flow from the pipe through to the fibrous material.

6. The tool as claimed in claim 5, wherein the metal surface comprises orifices allowing the coolant to leave the pipe and circulate through the fibrous material.

7. The tool as claimed in claim 5, wherein the metal surface is the surface of an open-pored material allowing the coolant to leave the pipe and circulate through the fibrous material.

8. The tool as claimed in claim 1, further comprising a damping member damping the coming into contact of the tool with the glass sheet.

9. The tool as claimed in claim 1, wherein the orientation member is a ball joint.

10. A device for bending and/or cooling a glass sheet, the device comprising:
    at least one tool for local cooling by contact of said glass sheet at a temperature higher than 450° C., the at least one tool comprising
    an internal pipe for the circulation of a coolant,
    a contact face suitable for coming into contact with the glass sheet to locally cool the glass sheet, the contact face in communication with the internal pipe so that the contact face is cooled by the coolant, and
    an orientation member configured to change an orientation of the internal pipe and the contact face under the effect of the at least one tool coming into contact with the glass sheet,
    the glass sheet comprising a peripheral compression belt while the glass sheet is held by a bending tool or by a cooling frame after bending, the at least one tool being configured to create, by said contact face, a local compression zone that, situated at least partially inside the peripheral compression belt of the glass sheet, has an area of less than 10% of an area of the glass sheet.

11. The device as claimed in claim 10, further comprising an upper bending form and a bending frame to support the sheet and press a periphery of the glass sheet against the upper bending form, at least one contact tool being rigidly connected to the bending frame so that the contact face comes into contact with the glass sheet when the glass sheet is held by the bending frame.

12. The device as claimed in claim 10, further comprising a forced cooling system that is configured to blow air onto the glass sheet supported by the cooling frame.

13. The device as claimed in claim 12, wherein the forced cooling system comprises cooling units capable of blowing cooling air towards the two main faces of a glass sheet resting on the cooling frame, wherein the at least one contact tool is mounted on at least one cooling unit.

14. The device as claimed in claim 13, wherein the cooling units are capable of being moved vertically relative to each other, allowing the cooling units to move together or apart, the units being capable of moving together when the cooling frame holding a glass sheet is between the cooling units so that each contact tool provided on a cooling unit comes into contact with one face of the glass sheet during or at the end of the moving together of all of the cooling units.

15. A method for producing a local compression zone in a glass sheet, the method comprising:
    heating the glass sheet to a temperature higher than a strain point temperature of the glass sheet, then
    generally cooling the glass sheet to a temperature lower than the strain point temperature of the glass sheet, and
    local cooling by local contact being applied by at least one contact tool, the contact starting while the glass sheet is at a temperature higher than its strain point temperature and at a temperature higher than 450°0 C., the at least one tool comprising
    an internal pipe for the circulation of a coolant,
    a contact face suitable for coming into contact with the glass sheet to locally cool the glass sheet, the contact face in communication with the internal pipe so that the contact face is cooled by the coolant, the glass sheet comprising a peripheral compression belt, and
    an orientation member configured to change an orientation of the internal pipe and the contact face under the effect of the at least one tool coming into contact with the glass sheet,
    the at least one tool being configured to create, by said contact face, a local compression zone that, situated at least partially inside the peripheral compression belt of the glass sheet, has an area of less than 10% of an area of the glass sheet, wherein the local contact is applied while the glass sheet is undergoing or at the end of bending and/or while the glass sheet is undergoing general cooling.

16. The method as claimed in claim 15, wherein the general cooling brings about a tempering or a semi-tempering of the glass.

17. The method as claimed in claim 15, wherein the local compression zone is inscribed in a circle with a diameter less than or equal to 80 mm.

18. A method for manufacturing a glass panel comprising a glass sheet comprising a local compression zone produced by the method of claim 15, comprising cutting a through-orifice in or on a border of the local compression zone of said glass sheet.

19. The method as claimed in claim 18, wherein a duration and intensity of the local cooling are sufficient so that, after cutting, a cut edge of the through-orifice has an edge compressive stress of at least 1 MPa and less than 25 MPa.

20. The method as claimed in claim 18, wherein the glass panel is a laminated glass panel, each glass sheet having, before cutting, a local compression zone facing local compression zones of the other glass sheets of the glass panel, cutting being performed on each glass sheet before assembly into a laminated glass panel, or cutting being performed after assembly of the laminated glass panel.

* * * * *